United States Patent Office 3,302,130
Patented Jan. 31, 1967

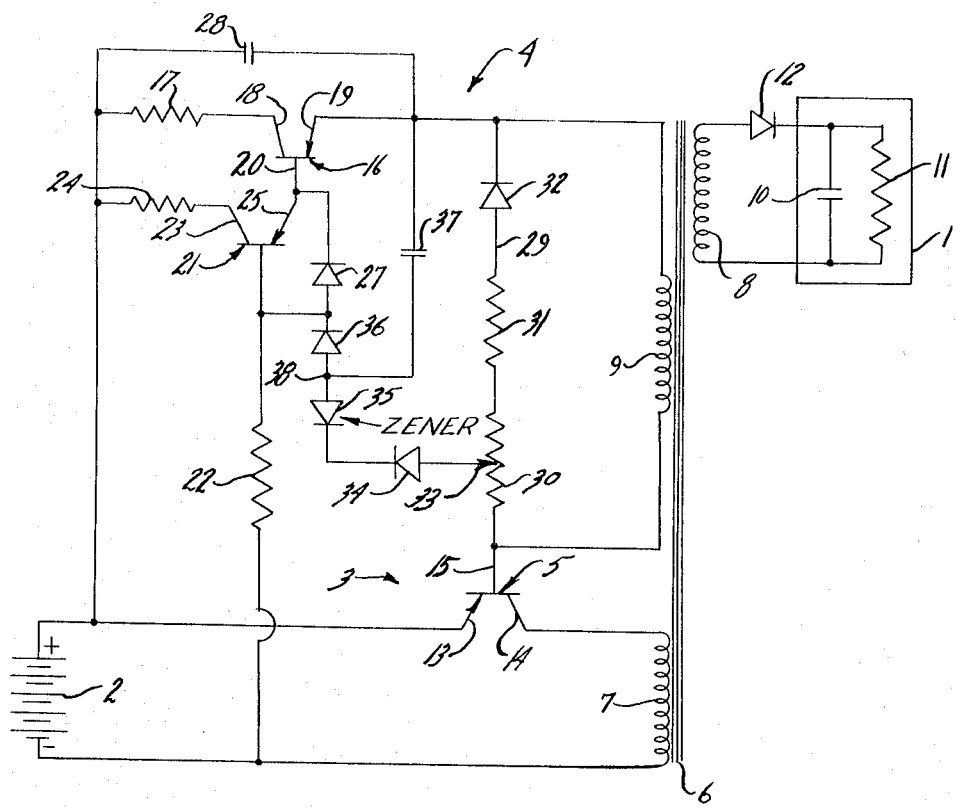

3,302,130
BLOCKING OSCILLATOR POWER CONVERTER UTILIZING A CONTROL OF A TRANSFORMER REFLECTED VOLTAGE INDICATIVE OF THE LOAD
Floyd M. Minks, Chester, N.H., assignor to Kiekhaefer Corporation, Fond du Lac, Wis., a corporation of Delaware
Filed July 29, 1964, Ser. No. 385,904
5 Claims. (Cl. 331—112)

This invention relates to a power converter and particularly to a blocking oscillator for converting a D.C. input voltage to a selected D.C. output voltage.

Generally, a blocking oscillator includes a switching device such as a transistor interconnected generally through a transformer to an output lead and to a feedback circuit connected in a control input of the transistor. Regenerative feedback is employed such that the transistor is driven between saturation and cutoff to provide the storage of energy in the transformer and transfer from the transformer of a pulsed direct current (D.C.) output to the load device. The output can be fed to a capacitor or similar storage device to store energy for a pulsed output of increased power.

A regulator circuit is often required with a blocking oscillator converter to prevent destruction of the unit. Thus, in an unregulated blocking oscillator, the output voltage is directly related to the load impedance and if the load impedance should increase to infinity, the output voltage must be limited by dissipation within the converter or by component failure. Transistorized blocking oscillator units which are extremely efficient and therefore desirable are particularly subject to component failure if special means are not provided to prevent excessive output voltage from being formed under no load condition.

The use of a blocking oscillator circuit has been generally known to give an efficient power conversion. This system is particularly desirable where a constant output voltage is desired in the presence of a widely varying input voltage or conversely when the output voltage is to be varied with a constant input voltage. Such systems are also useful where the average power drawn from the supply is small compared with the peak power required. The use of a highly efficient converter is of particular significance where a compact, battery driven power unit is desired or where the converter must operate from solar cells, thermoelectric units or the like.

Regulator circuits for blocking oscillators can be of a variety of forms. For example, a "Zener" diode or conventional shunt regulator connected across the output will limit the output voltage and dissipate the power not required by the load and will therefore be efficient only at full load.

The present invention, however, is particularly related to a blocking oscillator wherein the regulator circuit has means for sensing the output voltage, either directly or referred instantaneously through a conversion output transformer, and employs the sensed signal to control the power level at which the converter oscillates.

Basically, the present invention provides a reliable power converter circuit which may be formed as a compact and highly efficient unit by employing the concept of a variable effective impedance in the input circuit of the oscillator amplifying or switching means. The effective impedance is controlled to reduce the power input to maintain the voltage output at a selected or desired level. In a preferred construction, the blocking oscillator employs a main oscillating transistor or the like having an input biasing circuit controlled in accordance with a sensed output voltage proportional signal. A feedback signal is fed through a "Zener" diode or other similar functioning device into a bias circuit for controlling the impedance of the input circuit of the main oscillating transistor. Under normal conditions and prior to the increase of the output voltage to a selected level, the blocking oscillator operates in the normal manner to provide a series of charging pulses to the transformer and in turn to the load. As the output voltage builds up in the load to the selected level, the sensed signal applied to the biasing circuit is increased and reaches the level that causes conduction of the "Zener" device. Immediately upon such conduction, the current in the bias amplifying circuit changes rapidly to increase the impedance of the input to the oscillating transistor.

The present invention provides a converting unit having a high efficiency over wide varying voltage ranges and which can be constructed as a compact small assembly. The circuit is adapted for applications in connection with internal-combustion engines, electronic flash units or the like and more particularly in converters operating from solar cells, thermoelectric generators and the like such as appear highly useful in applications and mechanism for exploring outer space.

The drawing furnished herewith clearly illustrates an embodiment of the invention, disclosing the above as well as other specific features which will be clear to those skilled in the art.

The drawing is a schematic circuit diagram of a D.C. to D.C. converter feeding a variable impedance load from a low voltage battery source.

Referring to the drawing, a variable impedance load 1 is shown in block diagram and is adapted to be energized from a battery 2 through a blocking oscillator circuit 3. The input to the blocking oscillator circuit 3 is controlled as a result of a novel control circuit 4 particularly forming the subject matter of the present invention.

More particularly, the oscillator circuit 3 includes a transistor 5 connected in a common emitter circuit configuration with the input of a transformer 6. The transformer 6 includes a primary 7 serially connected in the output circuit of the transistor 5 and electromagnetically coupled to a secondary output or load winding 8 which is connected to the variable impedance load 1. A feedback winding 9 is connected in the input bias or control circuit 4 of the transistor 5 to provide a novel control of the transistor.

Generally, the oscillator circuit 3 operates through saturation and cutoff of the transistor 5. Thus, when the circuit is completed, current will flow through the transistor 5 and the transformer primary 7. Simultaneously, the voltage across the secondary winding 8 and the feedback winding 9 increase with the noted polarities and causes the current in the primary to rise until the transistor 5 is saturated. At that time, there will be no further current increase and the process reverses with the current in the circuit being reduced until the transistor 5 cuts off with the result of a reverse polarity in the output winding 8. Thus, the energy stored in the transformer magnetic field is transferred to the load.

The cycle will then repeat and will continue to repeat increasing the output voltage or power to the load 1 which for example may be a capacitor 10 in parallel with a load resistor 11 and connected to the output winding 8 in series with a blocking diode 12. In accordance with the present invention, the control circuit 4 senses the increasing voltage in the load 1 as a result of the reflected signal in the feedback winding 9 and at a selected voltage level varies the impedance in the input circuit of the transistor 5 to limit the input power.

More particularly, in the illustrated embodiment of the invention, the transistor 5 includes an emitter 13 connected to a positive lead from the battery 2, noted by the conventional sign (+). A collector 14 is connected in series with the primary winding 7 to a negative lead, noted by similar conventional sign (−), from the battery 2. The base 15 of transistor 5 is connected to the emitter 13 through feedback winding 9 and the control circuit 4. The transistor 5 is connected in a common emitter configuration with the base-collector junction being reverse biased and the base-emitter junction being forward and reverse biased through the control circuit to produce an oscillating or pulsed output.

The control circuit 4 includes a bias transistor 16 connected in a series base loop of transistor 5 with a current control or limiting resistor 17 between the emitter 13 and the one side of the feedback winding 9, the opposite side of which is connected directly to the base 15 of the transistor 5. The bias transistor 16 includes a collector 18 connected to the resistor 17 and an emitter 19 connected to the winding 9. The base 20 of transistor 16 is returned to the negative battery lead through a bias control transistor 21 and a base bias resistor 22.

The bias control transistor 21 is connected in a common emitter configuration so that it and transistor 16 are connected in a "super-alpha" configuration and thus act as a single varying high gain transistor which could be substituted for them. Transistor 21 includes a collector 23 connected to the emitter 13 of transistor 5 in series with a resistor 24. An emitter 25 is connected to the base 20 of the transistor 16 and a base 26 is connnected to the negative lead in series with the resistor 22. Current through this resistor 22 normally biases transistor 21 and in turn transistor 5 into saturation but these transistors can be driven out of this region by the output pulse reflected through the feedback winding 9 and the control circuit 4. When the output pulse reaches the desired level, a diode 27 connected from base 26 of transistor 21 to base 20 of transistor 16 permits an off signal on the base of transistor 21 to more fully turn off transistor 16.

A rapid turn-off capacitor 28 is connected across the series output circuit of the transistor 16 and the resistor 17. The capacitor 28 increases the efficiency of the system as it forces the transistor 5 to turn off more rapidly.

The control circuit 4 for controlling the blocking oscillator circuit 3 includes a voltage dividing branch 29 connected across or in parallel with the feedback winding 9. The voltage divider branch 29 includes an adjustable potentiometer 30 connected in common to the base 15 of the transistor 5 and the adjacent end of the feedback winding 9. The adjustable potentiometer 30 is connected in series between that point and the opposite side of the winding 9 in series with a fixed resistor 31 and a steering or blocking diode 32. The adjustable potentiometer 30 includes an adjustable tap 33 for adjusting the desired output voltage to which the control circuit is to respond. The tap 33 is connected into the control circuit 4 in series with a blocking diode 34, a "Zener" diode 35 and a blocking diode 36 to the base 26 of the bias control transistor 21. The tape 33 is also connected to the opposite side of the voltage dividing network 29 and the winding 9 in series with a capacitor 37 which is connected at one end to winding 9 and at the opposite end to a junction 38 between the "Zener" diode 35 and the diode 36.

The operation of the illustrated embodiment of the invention is summarized as follows.

When the circuit is completed, noise or other inherent instability in the base-emitter circuit of transistor 5 results in base current. This results in an increasing emitter-collector current which flows through primary winding 7 which produces regenerative feedback through winding 9 so that the transistor 5 rapidly enters the saturation region. Current in the transformer primary 7 therefore begins to increase as a ramp function of time. During this period, the energy is stored in the magnetic field of transformer 6. When the current through transformer winding 7 increases to the point where the transistor begins to leave the saturation region, the voltage coupled to the feedback winding 9 decreases with a resulting lowering of the forward bias which had been applied which in turn will drive the transistor further out of the saturation region. Consequently, transistor 5 will rapidly switch from the saturation to cutoff region resulting in a reversal in the polarity on the transformer windings. The energy which had been stored in the magnetic field is transferred to the capacitor 10 as the polarity of winding 8 will forward bias the diode 12. Simultaneously, the output voltage will be sensed instantaneously referred from the output winding 8 to the feedback winding 9 and will be applied into the bias control circuit 4. This voltage appears across the voltage dividing branch 29 with a portion of the voltage appearing at the tap 33 in accordance with the setting thereof. At a selected output voltage, the voltage between the tap 33 and the opposite end of the winding 9 will be sufficient to result in conduction of the "Zener" diode. The blocking diode 34 is of course forward biased and consequently the capacitor 37 is connected directly across the voltage of the dividing branch as set at tap 33 minus the "Zener" voltage. The current through the circuit will rapidly charge the capacitor 37 in the polarity indicated to the difference between the "Zener" voltage and the output voltage, referred as stated above. The positive side or terminal of capacitor 37 is connected through the diode 36 to the base 26 of the bias control transistor 21 and through diode 27 to base 20 of transistor 16. The bias control transistor 21 and the bias transistor 16 are thus biased off when the output voltage reaches the desired level and substantially increases the impedance in the base circuit of the transistor 5. The capacitor 37 slowly discharges through resistor 22.

Capacitor 37 and resistor 22 are selected to produce a relatively long time constant compared with the period of oscillation such that the transistors 16 and 21 are biased to maintain a high effective impedance in the base circuit. As a result, the subsequent charging cycles of transistor 5 and transformer 6 draw and store in the magnetic field of transformer 6 only a smaller amount of power from battery 2. When the load power is dissipated, as by transfer to an output unit, the reflected voltage signal is insufficient to overcome the "Zener" voltage of diode 35 and the circuit oscillates as previously noted to rapidly raise the output voltage to the desired level. Thus, the control circuit 4 gives continuous or smooth control of the output voltage to the desired level.

An oscillator circuit has been constructed in accordance with the drawing with the following components to provide a 100 volt, 40 watt output across a capacitor in parallel with the load resistor 11 from a 12 volt battery source:

| | |
|---|---|
| Oscillating transistor 5 | 2N1551A. |
| Transformer 6 | 281MH per 1000 turns with 24 turns on the primary winding 7, 12 turns on the feedback winding 9 and 120 turns on the secondary winding 8. |
| Bias transistor 15 | 2N380. |
| Resistor 16 | 3.6 ohms. |
| Bias control transistor | 2N44. |
| Resistor 23 | 60 ohms. |
| Turnoff capacitor 26 | 1 microfarad. |
| Potentiometer 28 | 100 ohms. |
| Fixed Resistor 29 | 100 ohms. |
| Diodes 30, 32 and 34 | 1N457. |
| Zener diode 33 | 6.8 volt ½ watt diode. |
| Capacitor 36 | 3.3 microfarads. |

The above illustration and figures are given to clearly illustrate a single embodiment of the invention and of course are not limiting in any respect regarding the basic concept of the present invention wherein a blocking oscillator is provided with a variable impedance or other similar functioning control in the input circuit of its switching portion to provide continuous control of the power input at a selected voltage output and thereby prevent power loss or destruction of the circuit components.

A D.C. to D.C. converter circuit of the above general construction was made for driving a semi-conductor controlled ignition system for an internal-combustion engine and by varying the load impedance was operated with varying input voltages producing a constant output voltage and with a varying output voltage from a constant input voltage. In the former operation, the input voltage was varied from 2 to 24 volts with the output held at 103 volts. In the latter operation, a low voltage battery of a nominal 12 volts constituted the input and the output was increased from 0 to 110 volts. The efficiency of the circuit was constant over practically the complete range. With the input voltage varying over a ten to one range, the efficiency was approximately 75% and with the output voltage varying over a ten to one range, the efficiency was generally 75%. However, the above is not considered a limitation on the regulation and efficiency of circuits which may be constructed employing the teaching of this invention.

The present invention thus provides a very reliable and efficient power converter which can be constructed in a small compact assembly and which is particularly adapted for providing power to either a variable voltage load or from a variable voltage power source or both.

Various modes of carrying out the invention are contemplated as being within the scope of the following claims particularly pointing out and distinctly claiming the subject matter which is regarded as the invention.

I claim:
1. A regulated converter, comprising
   an energy storage means including a charging winding, a combined sensing and feedback winding and an output winding said charging winding and feedback winding being regeneratively coupled to produce oscillations,
   an output load circuit means connected to the output winding,
   a charging circuit including an electronic switching means in series with said charging winding and power connection means, said switching means having an input circuit including said feedback winding and a variable impedance means controlling the conducting state of the switching means, and
   a voltage sensitive means connected in a control circuit across the feedback winding and connected to actuate said variable impedance in response to a reflected voltage signal indicative of said load condition from the output winding during the discharge cycle of the energy storage means and thereby regulate the output of the oscillator circuit.

2. The regulated converter of claim 1 wherein said variable impedance is
   an amplifying means connected in said control circuit and having a bias control means for controlling the effective impedance of the amplifying means and thereby of the input circuit of the switching means,
   a voltage divider circuit connected across the feedback winding and thereby energized in accordance with load voltage,
   a reference rectifier means and a capacitor serially connected across the voltage divider circuit and being reverse biased thereby, said rectifier means being responsive to a selected voltage level to conduct and charge the capacitor, and
   means connecting the bias control means of the amplifying means to the junction of the capacitor and the rectifier means to reduce the power input of the oscillator circuit upon conduction through the rectifier and thereby regulate the power output of the oscillator circuit.

3. The regulated converter of claim 1 wherein said variable impedance is a transistor means having an input bias circuit connected to derive power from the power connection and from the control circuit.

4. The regulated converter of claim 3 wherein said transistor means includes a pair of transistors interconnected to function as a single high gain transistor and having their input elements connected in series with each other and a resistor across the power connection and said control circuit is connected to supply current to said transistors in response to the selected output of the oscillator.

5. In a regulated blocking oscillator circuit for supplying power to a variable impedance load, comprising
   a main transistor having an emitter, collector and base,
   a transformer having a primary connected in series with the emitter and collector and a pair of input leads, said transformer having a winding constituting an output secondary and a feedback secondary,
   a load circuit having means to permit conduction from the secondary in only one direction,
   a control transistor having an emitter, collector and base,
   a resistor connected in series with the collector and emitter of the control transistor and the feedback secondary between an input lead and the base of the main transistor,
   a bias control transistor having an emitter, collector and base,
   a resistor connected in series with the collector and emitter of the bias control transistor between the input lead and the base of the control transistor,
   a resistor connected between the base of the bias control transistor and the second input lead,
   a bias capacitor connected between the emitter of the control transistor and the bias control transistor,
   a voltage dividing network connected across the feedback secondary and including a diode in series with a potentiometer having an adjustable output tap, said diode being polarized to conduct only during the transfer of power in the load circuit, and
   a "Zener" diode connected to the tap and to the base of the bias control transistor, said "Zener" diode being reverse biased by the secondary to conduct at a selected output voltage to vary the bias circuit of the main transistor and reduce the input power at the selected output power level.

References Cited by the Examiner

UNITED STATES PATENTS

| | | | |
|---|---|---|---|
| 2,959,745 | 11/1960 | Grieg | 331—113.1 |
| 2,968,738 | 1/1961 | Pintell | 331—113.1 |
| 3,067,378 | 12/1962 | Paynter | 331—113.1 |
| 3,069,612 | 12/1962 | Hamilton | 321—2 |
| 3,113,275 | 12/1963 | Minter | 331—112 |
| 3,114,096 | 12/1963 | Projain | 321—2 |
| 3,117,270 | 1/1964 | Tailleur | 331—113.1 |
| 3,119,056 | 1/1964 | Hatke et al. | 331—113.1 |
| 3,134,940 | 5/1964 | Massey et al. | 321—2 |
| 3,135,909 | 6/1964 | Anderson et al. | 321—2 |
| 3,202,902 | 8/1965 | Glass | 321—2 |

ROY LAKE, *Primary Examiner.*

JOHN KOMINSKI, *Assistant Examiner.*